Figure 2:
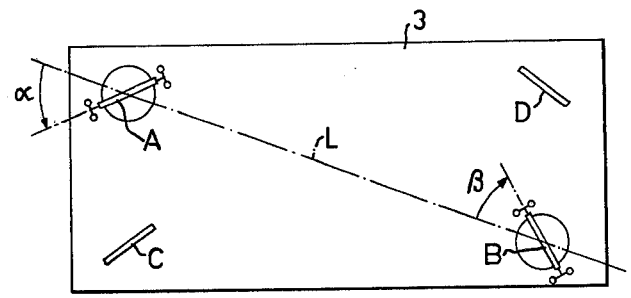

United States Patent [19]

Thole

[11] 4,127,182

[45] Nov. 28, 1978

[54] TRANSPORT SYSTEM FOR AUTOMATICALLY CONTROLLED MOTOR-DRIVEN TRANSPORT CARS AND TRANSPORT CAR FOR SAID TRANSPORT SYSTEM

[75] Inventor: Ulf L. Thole, Västra Frölunda, Sweden

[73] Assignee: AB Volvo, Göteborg, Sweden

[21] Appl. No.: 801,368

[22] Filed: May 27, 1977

[30] Foreign Application Priority Data

Jun. 1, 1976 [SE] Sweden ............................... 7606169

[51] Int. Cl.$^2$ ............................................. B60K 26/00
[52] U.S. Cl. ........................................ 180/98; 340/53
[58] Field of Search .................. 180/98, 77 R; 340/53

[56] References Cited

U.S. PATENT DOCUMENTS

| 3,912,037 | 10/1975 | Krieg | 180/98 |
| 4,044,853 | 8/1977 | Melke | 180/98 |

Primary Examiner—Richard A. Bertsch
Assistant Examiner—Michael Mar
Attorney, Agent, or Firm—Young & Thompson

[57] ABSTRACT

A transport system is described in which one or more motor-driven cars are guided along a path with provision for emitting signals along the path, which signals control the state of motion of the cars. A transport car for the transport system has a front and a rear drive wheel with individual drive motors, steering motors and antenna equipment and at least one additional wheel which is freely rotatably and freely swingably journalled.

3 Claims, 4 Drawing Figures

TRANSPORT SYSTEM FOR AUTOMATICALLY CONTROLLED MOTOR-DRIVEN TRANSPORT CARS AND TRANSPORT CAR FOR SAID TRANSPORT SYSTEM

The present invention relates to a transport system in which one or more motor-driven cars are guided along a path with means sending out signals along the path. These signals control the state of motion of the cars. The invention also relates to a transport car for the system with has a front and a rear drive wheel with individual drive motors, steering motors and antenna equipment as well as at least one additional wheel which is freely rotatably and freely swingably journalled.

A transport system and a car of the above type are previously known by, for example, Swedish Patent Application 7401503-3. The signal emitting means of the transport system are formed of an electric wire running in the direction of the path, and whose signals control the cars. The drive wheels of the cars lie in one plane parallel to the longitudinal direction of the cars and are controlled from the wire in such a way that in a first control function the front drive wheel, in the direction of motion, functions as the master wheel, whose antenna equipment detects the signals from the wire and steers the master wheel along the wire with the aid of control equipment. The rear wheel functions as slave wheel to which the turning angle of the master wheel is transmitted non-parallelly. In this manner both of the drive wheels follow the wire over straight and indentically curved portions of the path. The control equipment can be switched to a second control function in which the slave wheel is steered parallel to the master wheel, permitting lateral movement of the cars. To further increase the possibilities of movement of the cars the control equipment can be switched to a third control function in which the two wheels are fixed in a position perpendicular to the longitudinal axis of the car. One wheel follows the wire and the movement of the car is controlled by individual control of the speed of the wheels.

The system described is relatively complicated in its construction inter alia because of the control equipment, mounted on the cars, which can be switched between three different functions. This in turn requires that the electric wire running along the path be provided with ancillary wires, whose frequencies overlap the frequency of the main wire for initiating the switching. Due to its complicated construction the system is relatively susceptibly to disturbances. Furthermore the possibilities of movement for the cars are still limited.

The purpose of the present invention is to achieve a simplified transport system and transport cars thereto, making the possibilities of movement for the cars virtually unlimited.

This is achieved according to the invention by a transport system in which the signal emitting means are two electrical control wires, placed in the path, which emit various control signals for controlling individual wheels on the cars, said wheels being individually steered and driven.

Due to the fact that the driven wheels on the cars can be steered and driven independently of one another along individual separate steering wires, the need for complicated equipment, switchable between various control functions, is eliminated. The system also permits, in addition to the possibilities of movement given above, lateral movement of the cars with non-parallel drive wheels for example, so that a car can turn about its axis during lateral movement.

A transport car for the transport system is characterized according to the invention by control equipment, which is disposed to regulate the relative speeds of the drive wheels depending on the difference between the steering angle readings of the drive wheels.

Figure 1:
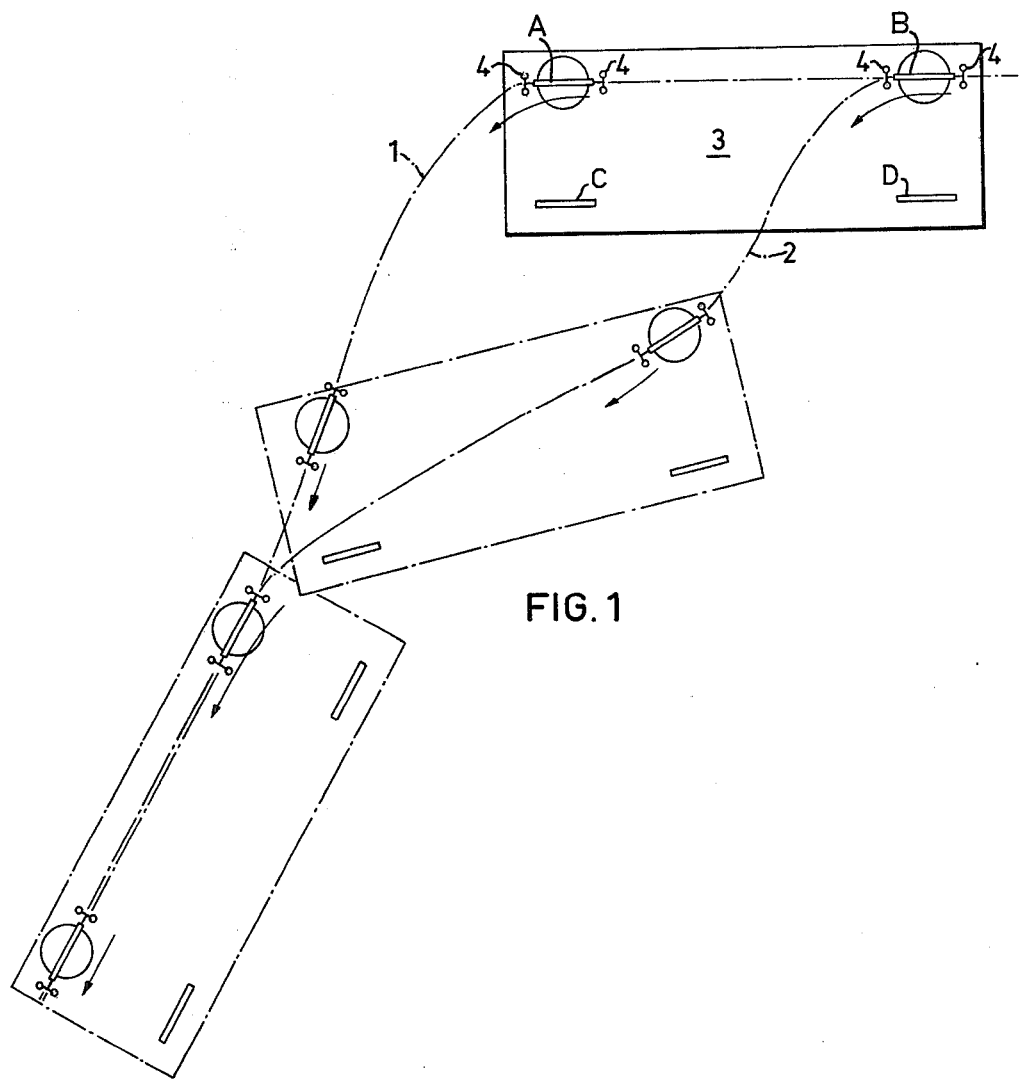
Figure 3:
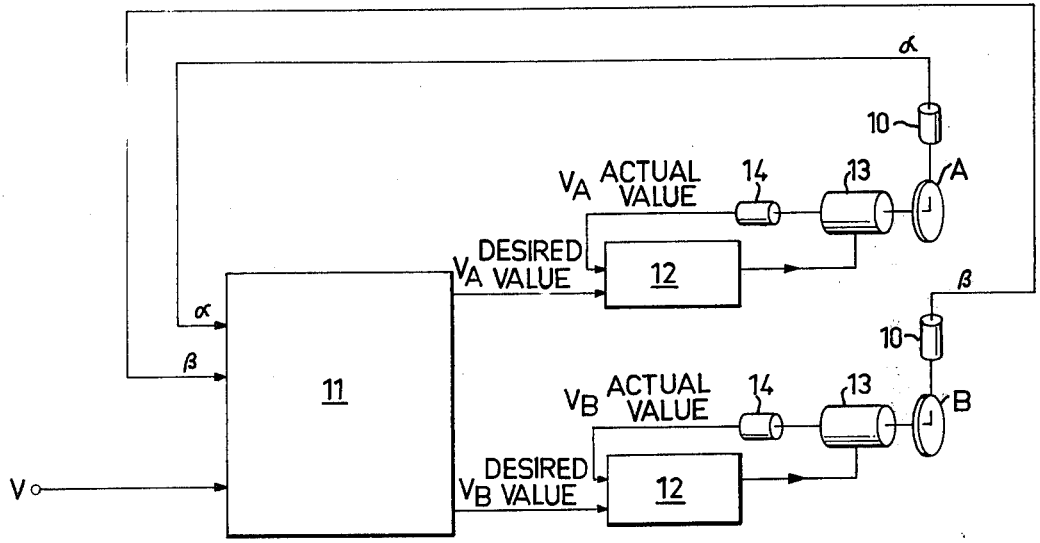
Figure 4:
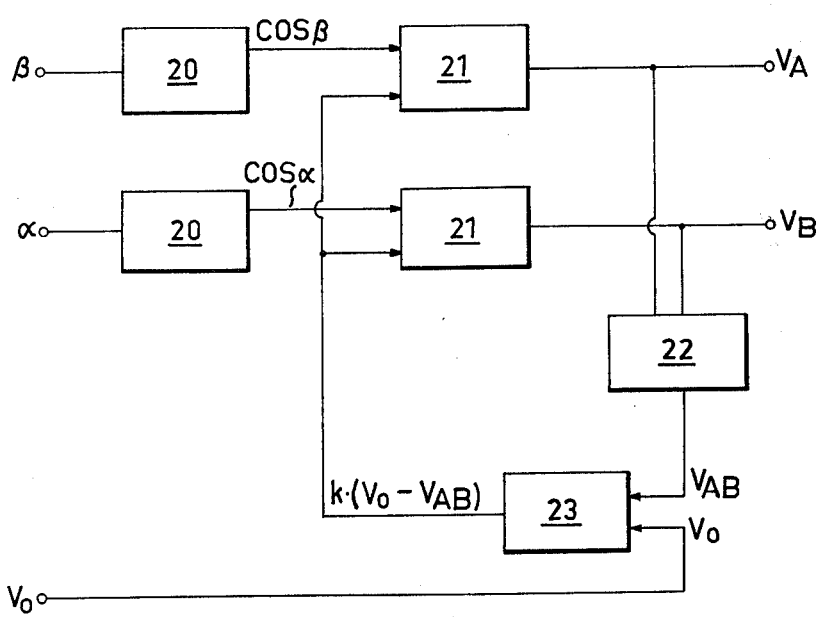

The invention is described in more detail now with reference to the accompanying drawings showing embodiments, in which FIG. 1 shows the movement pattern of a car moving through a section of the path in a transport system according to the invention, FIG. 2 shows a schematic view of a car from below, showing one example of wheel placement, FIG. 3 is a block diagram of the control equipment in a car and FIG. 4 is a block diagram of the computing unit in the control equipment in FIG. 3.

Running along the path section shown in FIG. 1 are two control wires 1 and 2, respectively, which consist of frequency-fed electric wires placed on the ground or in the floor. The wires have different frequencies to give control signals to individual drive and steering wheels A and B respectively on a car 3, shown schematically, which also has two swivel wheels C and D. The wheels A and B have drive and steering motors (not shown in detail here) which can be arranged as shown in the above-mentioned Swedish Pat. application 7401503-3, and individual antenna equipment for detecting the control signals from the wires 1 and 2 respectively. The anntenna equipment is indicated in the form of two pairs of induction coils 4 for each wheel, which swing with the wheels A and B. The antenna equipment controls the steering motors in a known manner via a signal receiver, so that a regulating signal is given to the steering motors for directional correction as soon as the induction balance between the pairs of induction coils 4 is disturbed. Thus the wheel A will follow wire 1 and wheel B will follow wire 2. In the section shown the wires 1 and 2 are close together at the beginning and at the end of the curve, and since wheels A and B lie here in the same plane parallel with the longitudinal axis of the car 3, the car is moved parallel with the wires. In the curved section the wires have different curvatures and the car 3 will therefore move laterally as indicated by the dashed lines in the figure, i.e. at the same time as the car moves laterally it will turn about its axis. Thus the wheels A and B must be driven at different rotational speeds. For this purpose the car has control equipment for relative speed regulation of the wheels A and B, which will be described below with reference to FIGS. 2–4.

FIG. 2 shows schematically the underside of a car 3, in which the drive wheels A and B are placed diagonally. This alternative placement has certain advantages relative to that shown in FIG. 1, as will be evident from that stated below.

FIG. 3 illustrates the speed control equipment for wheels A and B. It comprises an angle transmitter 10 for each wheel A and B which measures the steering angle deflection $\alpha$ or $\beta$ respectively of the respective wheel from a connecting line L between the steering shafts of the drive wheels (see FIG. 2). The angular values $\alpha$ and $\beta$ are fed into a computing unit 11, into which the command car speed $V_0$ is also fed. $V_0$ can be a fixed speed or can be commanded by signals from the control wires 1 and 2. The unit 11 computes a desired value for the speeds of the wheels, $V_A$ and $V_B$ respectively, which is fed into a speed regulator 12 for the drive motor 13 of the respective wheel A,B. In the speed regulator 12 the desired speed value is compared to the actual value which is obtained from a speedometer 14 coupled to the respective motor 13, and the regulator then makes a corresponding correction of the speed.

The computing unit computes the desired value for $V_A$ and $V_B$ according to the formula $V_A \cdot \cos\alpha = V_B \cdot \cos\beta$, it being adapted to select the larger value of $V_A$ and $V_B$ as equal to $V_0$.

By computing the desired value speeds according to this formula the speeds projected on the connecting line L will be equal, which assures that the relationship between the speeds is always correct so that one or both of the drive wheels do not slip. The reason for choosing the larger value of $V_A$ and $V_B$ equal to $V_0$ is that the type of transport cars which the invention relates to are often equipped with surrounding touch-sensitive emergency stop means which serve as collision protection and stop the car within a certain distance at a given highest speed. If the same drive wheel is always given the speed $V_0$, it can happen that the second drive wheel would sometimes have an appreciably higher speed which would not allow for braking of the car within the given distance.

The advantage of arranging the drive wheels A,B diagonally is that the steering angles $\alpha$ and $\beta$ to the connecting line L will not be 90° when the car is driven directly laterally with the wheels at 90° to the longitudinal axis of the car. $\cos\alpha$ and $\cos\beta$ are therefore not 0. If this were the case the car would stop since $V_A$ and $V_B$ computed according to the given formula would be 0.

FIG. 4 shows the computing unit 11 in block diagram form. The input angular values $\alpha$ and $\beta$ are transformed in units 20 to the corresponding cosine values, which are fed into multipliers 21. The value of the speeds $V_A$ and $V_B$ is fed into a transfer unit 22, which transmits the larger value of $V_A$ and $V_B$, designated $V_{AB}$, to an amplifier unit 23, into which the command speed $V_0$ is also fed. In the amplifier unit 23 the difference between $V_0$ and $V_{AB}$ is multiplied by an amplification factor K and the value obtained is fed into the multipliers 21. The amplification factor K determines how closely the larger value of $V_A$ and $V_B$ follows $V_0$. The amplification is required by the fact that the speeds of the wheels projected on the connecting line L drop as the steering angle deflections increase. But the difference between $V_0$ and $V_{AB}$ increases thus increasing the amplification. When $V_0$ is equal to $V_{AB}$, the amplification is zero.

The invention has been described in the preceding with reference to a preferred embodiment of control equipment for regulating the relationship between the speeds of the drive wheels on a car steered along two control wires. It should however be pointed out that there are other ways of achieving this speed regulation within the scope of the invention.

What I claim is:

1. Transport system, in which one or more motor-driven cars are guided along a path with means emitting signals along the path, said signals controlling the state of motion of the cars, the signal-emitting means comprising two electrical control wires (1, 2), placed in the path, which emit various control signals for controlling individual wheels on the cars (3), said wheels being individually steered and driven, a front and a rear drive wheel each having an individual drive motor, steering motor and antenna equipment, at least one additional wheel which is freely rotatably and freely swingably journalled, and control equipment (10, 11, 12, 13, 14) disposed to regulate the relative speeds of the drive wheels (A,B) depending on the difference between the steering angle deflections ($\alpha$, $\beta$) of the drive wheels; characterized in that the control equipment has a computing unit (11) into which the command speed $V_0$ for the car (3) is fed, and the unit computes the relationship between the desired values for the speeds $V_A$ and $V_B$ respectively, of the drive wheels, according to the formula $V_A \cdot \cos\alpha = V_B \cdot \cos\beta$, where $\alpha$ and $\beta$ are the steering angle deflections for the respective drive wheels (A,B) from a connecting line (L) between the drive wheels.

2. Transport car according to claim 1, characterized in that the computing unit (11) is adapted to selected the highest desired value of the speeds $V_A$ and $V_B$ of the drive wheels (A,B) as equal to the command speed $V_0$.

3. Transport car according to claim 1, characterized in that the drive wheels (A,B) are so placed on the car (3) that a connecting line (L) between the steering shafts of these wheels runs obliquely to the longitudinal axis of the car.

* * * * *